No. 748,564.         Patented December 29, 1903.

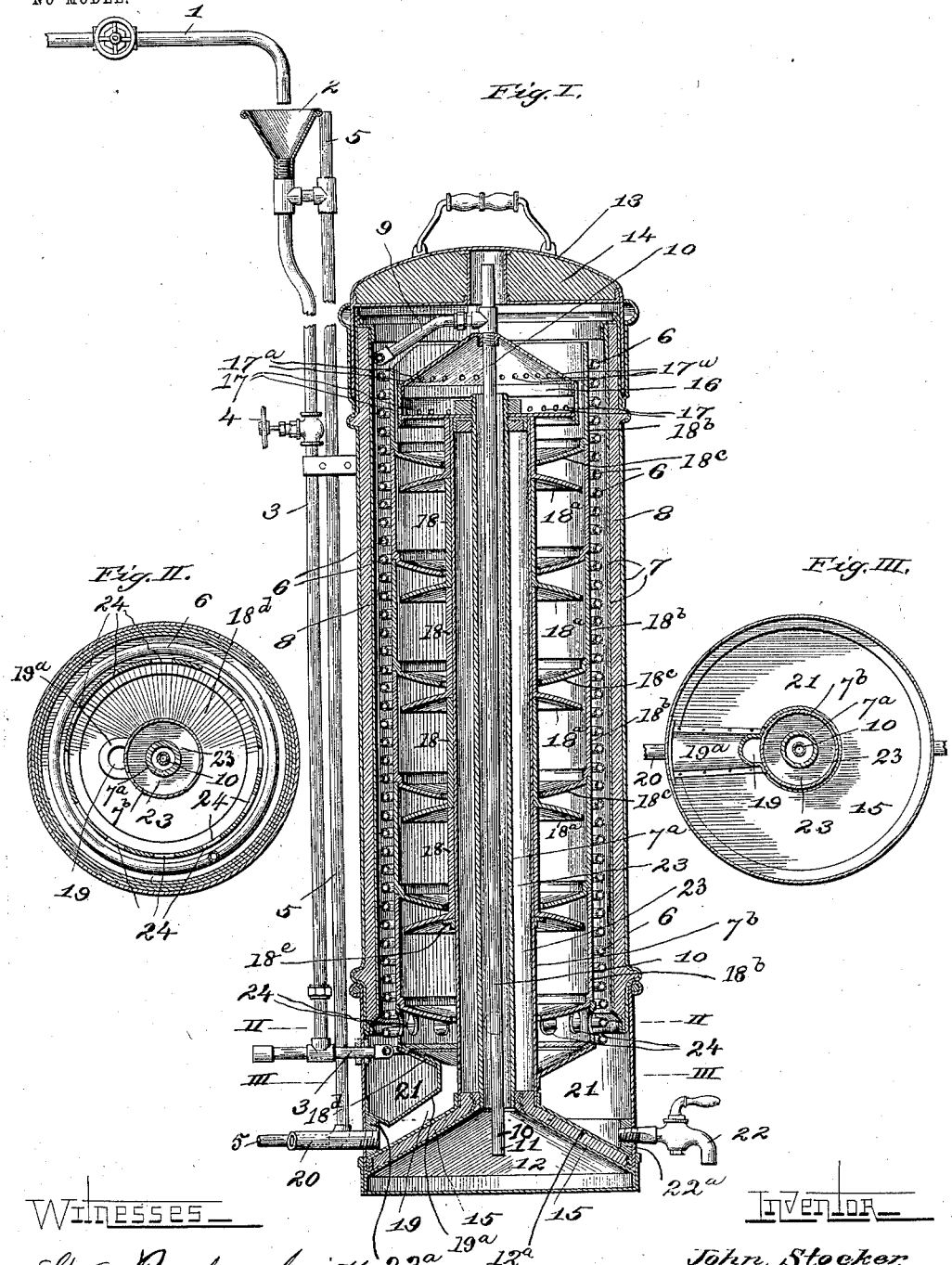

UNITED STATES PATENT OFFICE.

JOHN STOCKER, OF ST. LOUIS, MISSOURI; EVA ELIZABETH STOCKER ADMINISTRATRIX OF SAID JOHN STOCKER, DECEASED.

DISTILLING APPARATUS.

SPECIFICATION forming part of Letters Patent No. 748,564, dated December 29, 1903.

Application filed December 3, 1898. Serial No. 698,159. (No model.)

*To all whom it may concern:*

Be it known that I, JOHN STOCKER, a citizen of the United States, residing at the city of St. Louis, in the State of Missouri, have invented certain new and useful Improvements in Distilling Apparatus, of which the following is a full, clear, and exact description, reference being had to the accompanying drawings, forming part of this specification.

It is the object of my invention to furnish a device adapted to distil water on a small scale and which is capable of being easily carried from place to place, and thereby specially adapted for use in residences.

My invention consists in features of novelty hereinafter fully described, and pointed out in the claims.

Figure I illustrates a vertical section of my improved device. Fig. II represents a cross-section taken on the line II II, Fig. I, and looking downwardly. Fig. III is also a cross-section taken on the line III III, Fig. I, and looking downwardly.

1 is a pipe leading from a source of water-supply and which discharges into a funnel 2. This funnel leads into a pipe 3, furnished with a regulating-cock 4.

5 is an overflow-pipe adapted to carry off waste from the funnel 2 when the supply from the pipe 1 is too great. The pipe 3 leads to an outer coil 6, placed, as shown, within the tank 7. The tank 7 is supplied with insulation 8 between the walls thereof. The coil terminates at the top in the branch pipe 9, which discharges into a vertical pipe 10, located in the center of the tank, whose lower open end 11 discharges into a hot-water chamber 12, in which the water to be distilled is boiled. The top or cover 13 of the tank 7 is also supplied with insulation 14 and extends down over the body of the tank 7, so as to seal the same.

In the dome 12ª, surmounting the hot-water chamber, between the two sheet-metal plates thereof is a layer 15 of insulation that effectually prevents the passage of the intense heat from the interior of the hot-water chamber to the space within the apparatus above said dome, whereby it is possible to maintain a much lower temperature in such space than would otherwise be possible, owing to the close proximity of the boiling water in the chamber 12.

16 designates a conical-shaped chamber secured to the upper end of the pipe 10 beneath the branch 9, leading thereto. This conical-shaped chamber is furnished with a row of lower perforations 17 and a row of upper perforations 17ª.

7ª is an inner tube surrounding the pipe 10 and providing communication from the hot-water chamber 12 to the conical-shaped chamber 16, through which the water heated in the said first-mentioned chamber may flow to the last named.

7ᵇ is an outer tube concentric with the tube 7ª, but of materially greater diameter than the tube 7ª. This outer tube is mounted on the dome 12ª of the hot-water chamber, but is closed from communication with said chamber and is also closed at its upper end. By this arrangement a dead-air space 23 is provided surrounding the tube 7ª, through which the hot water flows, and this dead-air space receives the radiation of the heat from the tube 7ª, thereby rendering it possible to maintain a lower degree of temperature exterior of the outer tube 7ᵇ than would be possible were the air-space 23 omitted.

18 designates a series of collars encircling the outer tube 7ᵇ, placed one on top of another and having outwardly-projecting flanges 18ª, that flare downwardly. The lowermost of these collars is supported upon a ring 18ᵉ, encircling the tube 7ᵇ.

18ᵇ designates cups having inwardly-projecting flanges 18ᶜ, that extend into proximity with the collars 18, thereby leaving a space between for the passage of water from the surmounting cup onto the flange immediately beneath. The upright portions of the cups 18ª are placed one on top of another, as clearly seen in Fig. I, whereby they provide an air-tight wall located inside of the coil 6. These collars and cups 18 and 18ᵇ, with their flanges, form an inner cooling-tower, and they are so arranged that communication throughout is provided by reason of the space left between the flanges 18ᶜ of the cups and the collars, so that water may flow downwardly through the tower in a free manner, falling from one flange to another of the collars and cups, and finally be deposited into a pan 18$^d$, from which it flows into a discharge-passage 19, that is produced by the introduction of a pocket-plate 19$^a$, riveted to the top of the dome of the hot-water chamber 12 and also secured to the pan 18$^d$, so that the passage 19 is thoroughly shut off from communication with the surrounding space. (See Fig. III.)

20 is a short waste-pipe leading from the passage 19, through which the waste water from the apparatus is discharged. This waste-pipe is of materially increased diameter over that of the feed-pipe 3, (see Fig. I,) and it is therefore evident that such pipe would never be filled to its capacity in the small discharge of waste water as compared to the amount of water fed into the apparatus and that therefore opportunity is afforded for the ingress of fresh air through such waste-pipe into the passage 19 and thence into the lower end of the cooling-tower. The object of permitting fresh air to enter at this location will hereinafter appear.

21 designates a reservoir in which the distilled water dripping from the coil 6 accumulates, and 22 is a faucet through which such distilled water runs off. This faucet is always open, so that it provides an outlet for the air. The faucet 22 and the waste-pipe 20 are set into a cast-ring 22$^a$ on the interior of the tank 7 at its lower end for the purpose of providing firm supports for the seating of such parts instead of the weak support that would be afforded were they seated into the sheet metal of the tank only.

The pan 18$^d$ at the bottom of the cooling-tower is formed with a vertical wall, on which the lower cup 18$^b$ rests, and in this wall are a series of openings 24, that provide communication between the exterior and interior of said pan for the purpose of permitting a flow of moisture-saturated air to circulate from the exterior to the interior of said pan and thence upwardly through the cooling-tower, as hereinafter explained.

The apparatus is adapted to be placed over a suitable heat, which may be a stove, range, or gas-burner, and the operation is designed to be as follows: From the pipe 1 water at normal temperature flows into the feed-pipe 3. The pressure of water maintained in the feed-pipe is kept constant by means of the stop-cock 4 and the overflow from the funnel 2, in the combined use of which the pressure may be regulated to a nicety. The water passes from the feed-pipe 3 into the coil 6 at its lower end and gradually rises therein to the upper end of the coil at the top of the tank 7. It then flows through the branch pipe 9 into the pipe 10 and is conducted downwardly to the hot-water chamber 12, where it becomes heated. The flow of water into the hot-water chamber being kept constant, the water rises from the said chamber after becoming heated through the tube 7$^a$, surrounding the vertical pipe 10, to the conical-shaped chamber 16. Flowing into the said chamber 16 the hot water passes outwardly to the lower series of perforations 17 and finds egress through said perforations, descending onto the flange of the upper cup 18$^b$. Such water then flows from the cup-flange mentioned onto the collar-flange 18$^a$, immediately beneath, from which it in turn descends onto the next cup-flange through the space between the collar and cup flange. In this way the water continues to flow downwardly over the cup and collar flanges throughout the extent of the cooling-tower until it reaches the lower end of said tower, from which it finds egress by passing from the pan 18$^d$ through the passage 19 into the waste-pipe 20. It will be readily understood that the constant and measured flow of water into the apparatus through the feed-pipe 3 results in a similar flow of the same water after being heated through the lower perforations 17 in the conical chamber 16 to the cooling-tower. Besides the manner of regulating stated it is obvious that the pressure exerted may be readily regulated to a great extent according to the height or length of the feed-pipe 3. As the hot water flows into the chamber 16 and gradually and continually finds egress therefrom through the lower set of perforations 17 the steam from such hot water finds egress from the chamber 16 through the upper series of perforations 17$^a$. On emerging from the chamber 16 through said upper series of perforations the steam by reason of its lightness ascends instead of descending and passes over the edge of the vertical wall of the upper cup 18$^b$ and into the space occupied by the water-coil. The steam is carried down into the coil containing space by reason of the circulation of air occuring in the apparatus, as will be explained. As the steam passes down through such space it moves in contact with the coil 6, containing the constantly inflowing water, and such steam is formed into water condensation that descends into the reservoir 21. The entrance to the feed-pipe 3 being an open one, fresh air is constantly carried into the apparatus with the inflowing water and is discharged with the water into the chamber 12. Such air travels with the water from said chamber, and on leaving the chamber 16 it becomes to a large extent freed from the water and may circulate throughout the apparatus. The waste-pipe 20 being of greater diameter than is necessary for the amount of waste water discharged therethrough, a quantity of air is constantly passing through said waste-pipe, which is open at its outer end into the passage 19 and thence into the lower end of the cooling-tower at the location of the pan 18$^d$. The air present at all times in the apparatus is caused to continue constantly in circulation, and especially in the cooling-tower, against the descending water therein. In its circulation it moves upwardly through the cooling-tower composed of the collars and cups 18 and 18$^b$ and their flanges, thence into the coil-space at the upper end of the apparatus, downwardly through said coil-space, and again into the lower end of the cooling-tower through the openings 24 in the pan 18$^d$ to continue in the same manner. The circulation of air in the apparatus, and especially in the cooling-tower, is the result of, first, the difference of temperature in the different parts of the apparatus, and, second, the well-known physical fact that the specific gravity of air saturated with vapors is less than dry air, the difference increasing rapidly with increase of temperature. For example, saturated air at 52° Fahrenheit equals ninety-nine per cent. of the weight of dry air, and at 202° Fahrenheit it equals sixty-nine per cent. of the weight of dry air. Now as the temperature at the bottom of the apparatus, where a constantly-running stream of cold water is flowing into the coil 6, is lower than at the top of the apparatus, where the same water heated in the boiler below overflows the cooling-tower and keeps the upper end of the apparatus constantly heated, and as all the air that can find room in the apparatus enters with the water-supply and through the waste-pipe (which is never running full, as explained) it is evident that as soon as the cold air at the bottom of the cooling-tower becomes sufficiently heated and saturated with moisture by the hot water descending through the cooling-tower such air must rise to fill the vacuum caused by the condensation on the coil of the vapor accumulated at the top of the apparatus and cause in this way a current of air the greater the more efficient the condensation on the coil, and the quicker the air at the bottom of the cooling-tower becomes heated and saturated with vapor the lighter it relatively becomes.

If there were no changes of temperature in the different parts of the apparatus, there would not be any current of air, with the exception of that circulating with the inflowing and outflowing water; but the moment the air at the bottom of the cooling-tower becomes heated it saturates itself with vapor and becomes relatively lighter and rises to fill the vacuum at the top, causing thereby a current of air in the opposite direction to the overflowing water descending and constituting the well-known principle of a cooling-tower.

I claim as my invention—

1. In a water-distilling apparatus, the combination with a boiler, of a chamber and a condensing-coil therein and a cooling-tower concentric with said chamber, said tower and chamber opening into each other at the top and bottom and means connecting the cooling-tower with the outside atmosphere.

2. A distilling apparatus comprising a cooling-tower, a coil surrounding said tower, an inclosing tank surrounding said coil, a receiving-chamber beneath said coil, a supply-pipe leading into said coil, and a means of heating the water discharged from said coil, substantially as described.

3. A distilling apparatus comprising a supply-pipe, a tank furnished with an insulated wall, a coil connected with said supply-pipe and placed immediately within said wall, a cooling-tower within said coil, and a heating-chamber placed at the bottom of said tank and into which the water from said coil is discharged, substantially as described.

4. A distilling apparatus comprising a closed tank furnished with insulated walls, a supply-pipe, a coil located within said tank and connected with said supply-pipe, a cooling-tower within said coil, an evaporating-chamber at the top of said tower, a heating-chamber at the bottom of said tower, a pipe leading from the top of said coil to said heating-chamber, a communicating passage between said heating-chamber and said evaporating-chamber, and a receiving-tank beneath the said coil, substantially as described.

JOHN STOCKER.

In presence of—
E. S. KNIGHT,
STANLEY STONER.